United States Patent Office 3,068,159
Patented Dec. 11, 1962

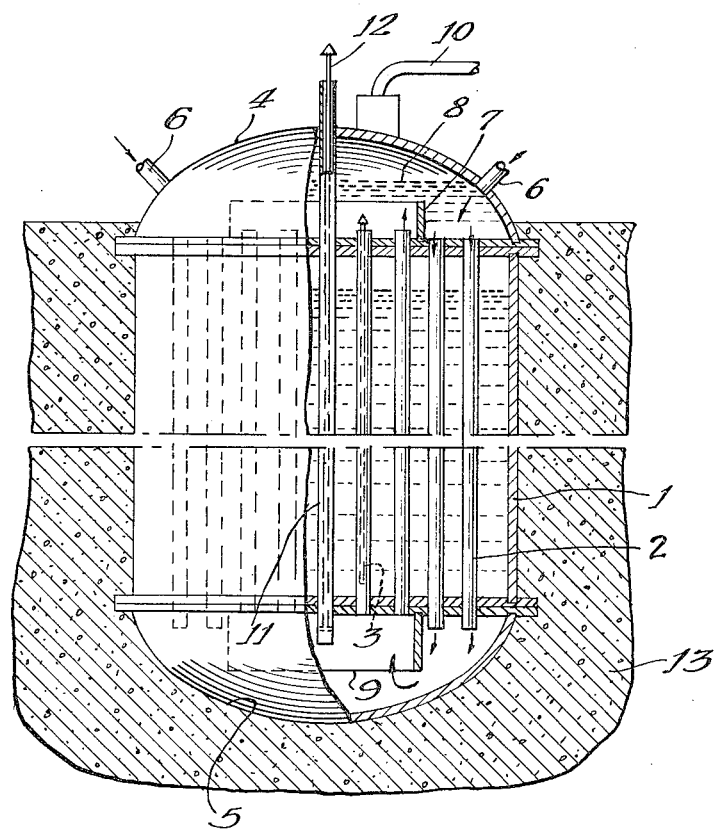

3,068,159
PROCESS FOR COOLING A NUCLEAR REACTOR
Lyle B. Borst, Oak Ridge, Tenn., assignor to the United States of America as represented by the United States Atomic Energy Commission
Filed Jan. 4, 1946, Ser. No. 639,136
2 Claims. (Cl. 204—154.2)

This invention relates to neutronic reactors, and particularly to cooling means therefor.

For the purpose of illustration, the present invention is described as applied to a reactor of the general character disclosed in copending application of Leo Szilard, Serial Number 664,145, filed April 23, 1946, now Patent No. 2,832,733 dated April 29, 1958, its use in connection with other types of reactors being readily apparent from the illustrative example.

One of the principal objects of the present invention is to cool a neutronic reactor more efficiently, thus making possible greater power output from a smaller reactor.

Another object is to provide a coolant which is operable at relatively high temperatures and low pressures and of which the ratio of absorption of thermal neutrons to the heat absorption capacity is relatively low.

Another object is to provide a coolant which is operable at its critical point in connection with structural materials and fissionable material now known to be satisfactory for neutronic reactors, without danger of corrosion of, and chemical reactions with, the structural and fissionable materials.

Another object is to provide a liquid coolant which is capable of changing from a liquid to a vapor state without boiling.

Other objects and advantages will become apparent from the following description wherein reference is made to the drawing in which the single FIGURE is a diagrammatic vertical sectional view, partly in elevation, through the axis of a reactor embodying the principles of the present invention.

In all neutronic reactors a large amount of heat is generated due to the fission of the active material, the rate of heat generation being proportional to the rate at which the fission takes place. If not controlled, the increase in the rate of fission is exponential. Due to the limitations of structural and other materials used in such reactors, damage to the reactor can be prevented only by the circulation of adequate coolant, the maximum power output of a given large size reactor being limited by the capacity of the cooling system.

In general, the cooling is effected by passage of a coolant in contact with, or in close proximity to, the fissionable material in which the heat originates. However, several problems are presented in providing a coolant which will meet the various conditions of operation.

In the first place, the reproduction factor of a reactor must be maintained slightly above unity. There is a loss of neutrons inherent in the structure which cannot be avoided. This loss makes it necessary to set a very low limit on the amount of neutrons which are sacrificed by absorption by the cooling system as otherwise the critical size of the reactor would have to be so large that the construction would be impractical. Usually only about 0.03 to 0.04 reproduction factor can be allotted to the entire cooling system.

In addition, certain materials have thus far been proven satisfactory for use in a reactor structure, and these materials, while best suited for use due to their low neutron absorbing characteristics, resistance to corrosion and the like, cannot withstand extremely high temperatures and pressures. Furthermore, the fissionable material is usually uranium and corrosion is quite apt to occur in varying degrees if the coolant should happen to come into direct contact therewith.

The coolant must be segregated from the moderator due to possible chemical combinations therewith and corrosion, and accordingly the active metal is usually placed in tubes extending through the moderator. The materials which can be used for such tubes are limited also by requirements of corrosion resistance, tolerance, pressures, temperatures, elongation and contraction, and neutron absorption characteristics. Aluminum is a good metal for coolant tubes, moderator containers and other metal parts without too much reduction in the reproduction factor.

It is apparent, therefore, that in attempting to change from a known coolant to a new coolant, consideration must be given to a large number of coexisting and interrelated factors, such as characteristics of all the materials with which the coolant will come in contact, the neutron absorption characteristics of the coolant itself, its action under various temperatures, its possible chemical reactions with other materials, its capture cross section and specific heat, its viscosity and thermal conductivity. Specifically, it is desirable that the fluid to be used display a minimum absorption of thermal neutrons per unit of heat absorption capacity. The coolant should have what is termed a low "isocaloric capture cross section." This term is used to define the ratio of absorption of thermal neutrons to a unit of heat capacity and is defined by the expression:

$$i_n = \frac{10^{24} \times \Sigma \sigma}{C_p \times M.W.}$$

where $\Sigma \sigma$=the sum of atom capture cross sections in a molecule of the material; $C_p$=the specific heat at constant pressure; and M.W.=the molecular weight.

Low values for $i_n$ are desirable in general and cooling fluids for reactors should be compared on the basis of their specific heats and thermal neutron capture cross sections, having in mind the other properties for which allowance must be made due to the materials used in the equipment and the reactor structure.

Among various materials that may be used, it has been found that sulphur dioxide, $SO_2$, is particularly desirable in that its isocaloric capture cross section is good in relation to other coolants; it has very limited radioactivity when exposed to intense radiations in a neutronic reactor; it is effective as a coolant at its critical point and advantage can be taken of its high specific heat at the critical point. It has another distinct advantage in that it changes from a liquid to a vapor state without boiling, at the temperatures encountered in an operating neutronic reactor, since the critical temperature of this substance is well within the range of temperatures attainable with the materials of construction already well known in the art. For purposes of comparisons of $SO_2$ with other known coolants, the following tabulation is provided:

| Substance: | $i_n$ |
|---|---|
| $D_2O$ | .00075 |
| $CD_4$ | .00105 |
| $N—C_7F_{16}$ | .0022 |
| Bi | .0016 |
| $H_2O$ | .044 |
| $SO_2$ | <.044 |

The above tabulation is based on room temperatures. As is well known, the heat absorption is much greater at the critical temperature.

A suitable reactor employing the present coolant is illustrated in the drawing and may comprise a stainless steel tank 1 which is closed at both ends and is traversed from top to bottom by aluminum tubes 2 in which rods 3 of fissionable material are accommodated. The tank is provided at the top with an inlet header 4 and at the bottom with a recirculating header 5, these headers being sealed to the tank and the tubes 2 opening thereinto at their ends, respectively. The inlet header has a plurality of inlet pipes 6 through which fluid sulphur dioxide is admitted from a suitable condenser (not shown). On the top of the tank 1, within the header 4, is an annular baffle 7 which surrounds the central group of tubes 2 and extends almost to the liquid level, indicated at 8, which is maintained in the header 4. At its lower end, the tank is provided with a similar baffle 9, which surrounds, at their opposite ends, the outlets of the same tubes as those surrounded by the baffle 7. The baffle 9 terminates short of the bottom of the header 5. With this arrangement the coolant from the inlet pipes 6 flows downwardly through the outer tubes 2 of the reactor around the under edge of the baffle 9 and thence upwardly through the inwardly disposed tubes, and then discharges within the baffle 7.

It will be readily understood that the selection of materials, the critical sizes, and the design of portions of the reactor other than the coolant fluid to be employed constitute no part of the present invention. The criteria for a structure capable of maintaining a self-sustaining chain reaction are well known in the art, as exemplified by the co-pending application mentioned above.

As mentioned, the sulphur dioxide changes from liquid to vapor at its critical point without boiling. Accordingly, the liquid level 8 is maintained somewhat below the top wall of the header 4 so as to provide a vapor chamber. A suitable conduit 10 leads from the top of the vapor chamber to a condenser (not shown). Thus, the liquid sulphur dioxide returning from the condenser may pass through the tubes 2 and cool the fissionable material therein and be discharged substantially at or slightly above the critical point whereupon it passes upwardly to the vapor chamber into the condenser where the heat is removed, so that it may be recirculated as a liquid.

In order to control the reactor, a suitable well 11 is provided, preferably at the axis of the tank 1. This well is closed at the bottom and extends upwardly through the top of the tank 1 and the header 4 so as to be accessible from the outside of the reactor. A suitable rod 12 of material having high neutron absorption characteristics, such as cadmium or boron, is used to effect the desired control of power development of the reactor. The rod 12 is so related to the reactor that the reactor can be completely shut down by fully inserting the rod 12 in the well 11.

The reactor is provided with the usual shield 13 which may be of hydrogenous material, concrete or other suitable shielding material.

Due to the characteristics of the sulphur dioxide, a flow of coolant may be maintained by convection and the temperature of the reactor may be maintained within safe limits without danger of overheating and development of high pressures. Water has a critical point at about 374° C. at about 217.2 atmospheres pressure, whereas sulphur dioxide has a critical point of 150° C. at about 77.7 atmospheres pressure. Due to these last named characteristics of sulphur dioxide, thin walled aluminum cooling tubes can be used with safety, thus reducing the neutron absorption by the tubes, the space required for coolant in the tubes, the pressure required for circulation of coolant, and the spacing of the tubes themselves from each other.

While the invention has been disclosed as applied to a liquid moderated reactor, the same advantages result from its use with reactors employing materials such as graphite, and the like, as moderators. Examples of liquid moderated and graphite moderated reactors are presented in Fermi et al. Patent No. 2,708,656.

What is claimed is:

1. In a process of operating a neutronic reactor in which liquid sulphur dioxide is flowed in heat exchange relationship with bodies containing material fissionable by neutrons of thermal energy to absorb the heat given off in the fission process, the improvement comprising maintaining the sulphur dioxide at least as high as its critical pressure, operating the neutronic reactor at a power level which is sufficient to heat the sulphur dioxide in the neutronic reactor to its critical temperature whereby the sulphur dioxide vaporizes without boiling, removing heat from the sulphur dioxide outside the reactor to cool the sulphur dioxide below its critical temperature, and recycling the cooled sulphur dioxide through the reactor.

2. A process for cooling a neutronic reactor comprising an upper header, a lower header and a core containing inner and outer groups of coolant tubes connecting these headers, in which the core contains bodies containing material fissionable by neutrons of thermal energy, comprising introducing liquid sulphur dioxide into the reactor and operating the reactor at a power level which is sufficient to heat the sulphur dioxide to its critical temperature, thereby causing the sulphur dioxide to circulate through the reactor in heat exchange relationship with the bodies of fissionable material, maintaining the sulphur dioxide above its critical pressure whereby the sulphur dioxide heated to its critical temperature vaporizes without boiling, removing the vapor phase of the sulphur dioxide, cooling it below its critical temperature, and reintroducing the so liquified sulphur dioxide into the reactor.

References Cited in the file of this patent

UNITED STATES PATENTS

| 2,305,337 | Allen et al. | Dec. 15, 1942 |
| 2,708,656 | Fermi et al. | May 17, 1955 |

FOREIGN PATENTS

| 233,011 | Switzerland | Oct. 2, 1944 |
| 114,150 | Australia | May 2, 1940 |

OTHER REFERENCES

McAdams: Heat Transmission, 2nd edition, pages 398 and 401 (1942), published by McGraw-Hill, New York.

Goodman: "The Science and Engineering of Nuclear Power," volume 1, page 275, Addison-Wesley (1947).

Kelly et al.: Phy. Rev., 73, 1135–9 (1948).

Fermi et al.: "Artificial Radioactivity Produced by Neutron Bombardment—II," Proceeding of the Royal Society of London, Series A, No. 868, vol. 149, pp. 522–558, April 1935.